United States Patent [19]

Vial

[11] 4,046,984
[45] Sept. 6, 1977

[54] CUTTING-OFF MACHINE WORKING BY ELECTRIC SPARKING

[75] Inventor: Guy Aimé Vial, Pont de Claix, France

[73] Assignee: Vial S.A.R.L., Eybens, France

[21] Appl. No.: 645,304

[22] Filed: Dec. 29, 1975

[30] Foreign Application Priority Data

Jan. 17, 1975   France .............................. 75.01376

[51] Int. Cl.² .............................................. B23P 1/08
[52] U.S. Cl. ............................................... 219/69 E
[58] Field of Search ................ 219/69 E, 69 M, 69 R, 219/68

[56] References Cited

U.S. PATENT DOCUMENTS

| | | | |
|---|---|---|---|
| 1,619,627 | 3/1927 | Neiss ..................................... | 219/68 |
| 3,338,808 | 8/1967 | Johnson ................................. | 219/68 |
| 3,392,255 | 7/1968 | Rye et al. ............................... | 219/68 |
| 3,663,787 | 6/1972 | Haswell et al. ...................... | 219/69 E |

FOREIGN PATENT DOCUMENTS

| | | | |
|---|---|---|---|
| 1,387,865 | 12/1969 | France .............................. | 219/69 E |
| 1,265,272 | 5/1961 | France .............................. | 219/69 E |

*Primary Examiner*—Bruce A. Reynolds
*Attorney, Agent, or Firm*—Brisebois & Kruger

[57] ABSTRACT

The present invention relates to a cutting-off or parting device working by electric sparking, enabling electrically-conductive materials to be cut-off by means of a metallic disc which circulates an electric current, the disc being composed of one or more substances which are electrically conductive during the cutting-off operation and being provided with three or more radial slots formed at the periphery of the disc, the latter being so arranged as to permit the transverse passage of a dielectric cooling liquid from one face of the disc to the other, a first means keeping the disc flat during the cutting operation and a second means being provided for constantly maintaining an equal radius over its entire periphery. Optimum relations between the dimensions of the radial slots and the initial radius of the disc are specified. The disc may be perforated or may be made from sintered or cellular products.

15 Claims, 9 Drawing Figures

CUTTING-OFF MACHINE WORKING BY ELECTRIC SPARKING

The present invention relates to a cutting-off mahine working by electric sparking, that is to say a device enabling electrically-conductive materials to be parted-off by means of a metal disc inside which circulates an electric current.

French Patent No. 2,199,673 in the name of the Applicant of the present patent described such a device, which is composed in particular of a metal disc of perforated sheet, the evacuation of the particles removed and the cooling of the cut being effected especially by means of a dielectric liquid carried away by the disc.

The fact of utilizing a dielectric liquid as the cooling liquid overcomes the main drawback of the other known devices which utilize an electrolytic liquid. In fact, in this latter case, as the liquid is itself a conductor of electricity, a funnel-shaped cut is obtained, and it is thus impossible to produce parallel cuts. This is due to the fact that independently of the disc which gradually cuts by its edge the material to be parted, an electrical erosion is continuously produced between the two sides of the section of the material and the two lateral surfaces of the disc, which leads to the presence of a relief or back-off.

The perforations of the metal disc enable the various metallic particles removed by the sparking to be evacuated.

The device forming the subject of the French Patent referred to above is perfectly valid, especially for parting-off hard steels. It has however been observed that certain materials form burrs after cutting-off, especially when the said materials are constituted by mild steel, light alloys or any other soft material.

In order to avoid these burrs, it has been found that the disc must remain flat during the whole parting operation, and that furthermore it must retain a constant radius over its whole periphery, which implies in this last necessity, a continuous sharpening process.

The device forming the object of the present invention complies with those requirements and effects parallel cuts which are free from any burrs.

The above-mentioned device is especially remarkable in that it utilizes a disc constituted by one or a number of substances permitting a transverse passage of the dielectric cooling liquid from one face of the disc to the other, a first means being provided for keeping the disc flat during the cutting-off operation and a second means being provided, if so desired, for giving the disc an equal radius over its entire periphery.

The device is characterized in that the said first means are constituted by at least three peripheral radial slots formed in the disc.

The device is also remarkable in that the said second means are constituted by the electric current which supplies the disc.

Other characteristic features and advantages of the invention will be brought out more clearly in the description which follows below, reference being made to the accompanying drawings, given solely by way of indication and not in any restrictive sense. In these drawings.

Figure 1:
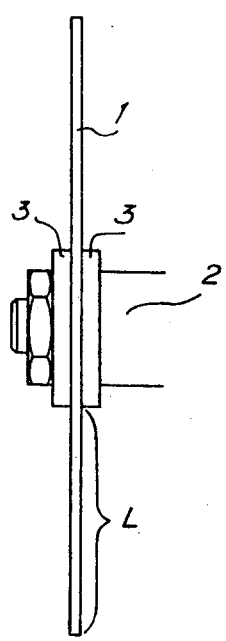
FIG. 1 is a profile view of a disc employed in the device according to the invention.

As will be seen from FIG. 1, the disc 1 is centered on a spindle 2 through which the electric current is fed, two end-plates 3 permitting the maintenance of the disc 1 on the spindle 2. The remainder of the device (not shown on the present drawings) is that of the above-mentioned French Patent, as illustrated by FIGS. 1 to 3 of the said prior patent.

The two end-plates 3 thus define on the disc 1 a ring of width L, constituting what will be termed, in the remainder of the present description and the claims, the useful surface of the disc, the width of this useful surface being the value L.

Figure 2:
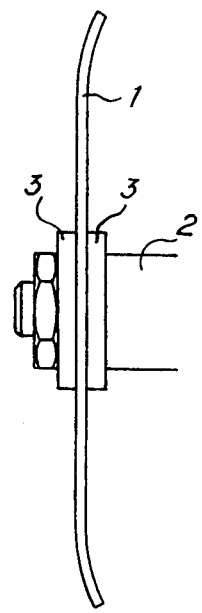
FIG. 2 is a diagrammatic view showing the appearance of the disc when traversed by a current of high intensity.

Thus, as has previously been seen, when the disc is traversed by a current of high value, which is not rare, since the average value is of the order of 1,000 to 2,000 A, the disc has a tendency to be deformed so as to take-up the shape illustrated in FIG. 2. A slight amount of curvature is acceptable for the cutting of hard steels, but it is not acceptable in the case of mild steels and other soft materials.

Figure 3:
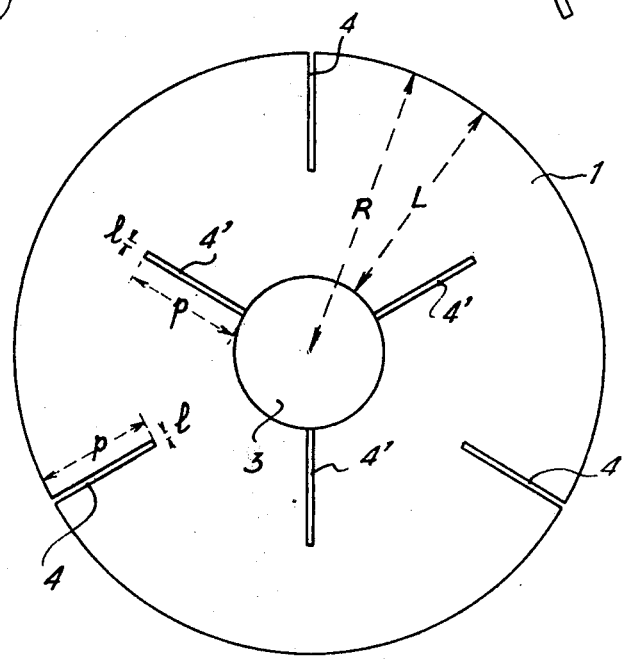
FIG. 3 is a plan view of a disc provided with slots according to the present invention.

FIG. 3 illustrates a first means for preventing the disc from assuming such a curvature. It has been found that these means could consist of radial slots formed on the periphery of the disc. A minimum number of three slots appears to be necessary, and four or six of these slots will preferably be provided. In the form of embodiment illustrated in FIG. 3, there are three slots, these slots 4 having a depth $p$ and a width $l$.

Figure 4:
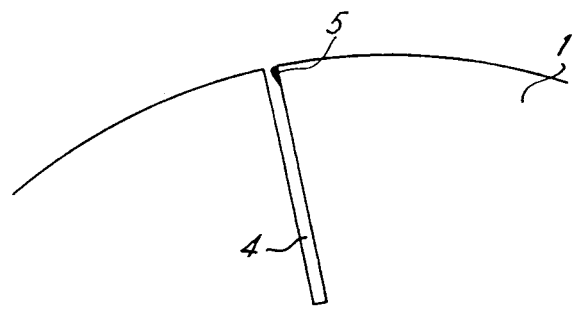
FIG. 4 represents a detail of FIG. 3.

When the width $l$ is too small, particles torn away from the parted material become grouped together in the slots, on the trailing edges 5 at the level of the periphery of the disc, as shown in FIG. 4, and the disc then takes on a certain curvature, the arrow F indicating the direction of rotation of the disc 1.

If R represents the radius of the disc, various tests have made it posssible to show that the disc remains flat, provided that $l \geq 1.75\ R/100$; preferably this relation is chosen to be $l = 2\ R/100$.

The depth $p$ of the slot 4 also plays an essential part. If $p$ is too small, the disc has a tendency to become curved; if $p$ is too large, the disc has no longer a good performance and it deteriorates rapidly.

Account must also be taken of the gradual wear of the disc, which results in a gradual reduction of the value of $p$.

A satisfactory form of construction has been found and is illustrated in FIG. 3, from which it is seen that the disc 1 has one of its end-plates 3 which defines the useful surface of width L. Peripheral radial slots 4, three in the present case, have been formed at the periphery of the disc 1 and have a depth $p$ where $p > L/2$. Three central radial slots 4' have been formed towards the centre of the disc, at the level of the periphery of the end-plates 3; the size of these slots is the same as that of the slots 4.

It is obvious that in case of pronounced wear of the disc, the slots 4 become gradually smaller, and a moment arrives when p is very small, thus creating a risk of curvature of the disc. Such curvature is avoided by means of the slots 4' which themselves become peripheral radial slots as a result of the wear of the disc. It is thus essential that there should be an overlap between the slots 4 and the slots 4'. In consequence, the relation chosen will preferably be $0.5 \, L < p \leq 0.8 \, l$, where $p$ is the initial depth of the peripheral radial slots and the central radial slots.

According to a preferred form of embodiment, the number of radial slots 4' is equal to that of the radial slots 4. It is however possible to contemplate a different number for these various slots.

In order to reduce still further the risk of burrs due to the curvature of the disc 1 under the effect of the electric current passing through it, it has been found that it was desirable to provide the material to be parted with two earth connections arranged symmetrically on each side of the plane of cut carried out by the disc 1. In fact, when there is only a single earth connection, it has been observed that the disc became curved in the direction of the side of the said earth connection.

According to the present invention, second means have been provided for avoiding the presence of burrs on the cuts of the materials to be parted. Irrespective of the maintenance of the flat nature of the disc during the parting operation, care must be taken to see that the radius R of the disc is the same over its entire periphery, and the disc must therefore be continuously ground. This problem does not arise in practice for the cutting-off of hard steels which are only slightly affected by slight differences in the radius R of the disc. This is not at all the case for soft materials, in which the slightest difference of the radius R at one point of the disc causes a tearing of the material and thus results in the presence of burrs.

Figure 5:
FIG. 5 is a waveform of the current supplied to the disc according to the invention.
Figure 5:
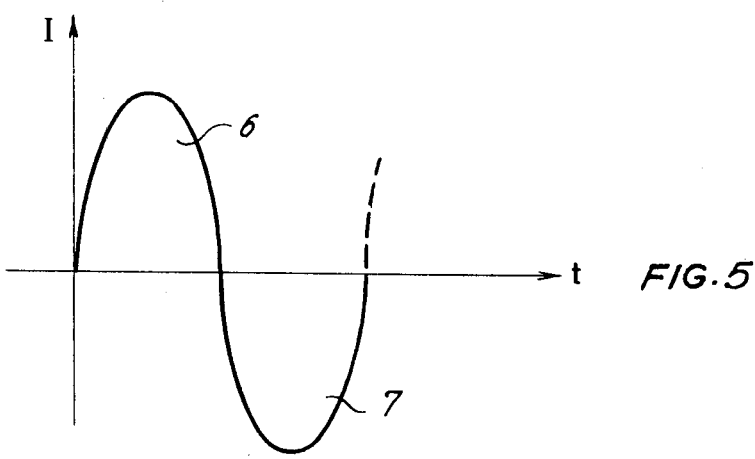
Figure 6:
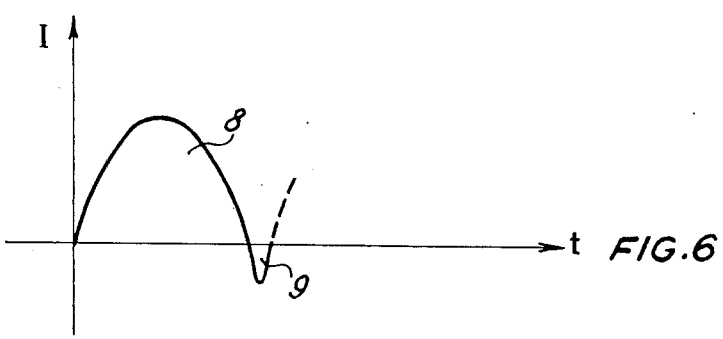
FIG. 6 is another wave-form of the current applied to the disc according to the invention.
Figure 7:
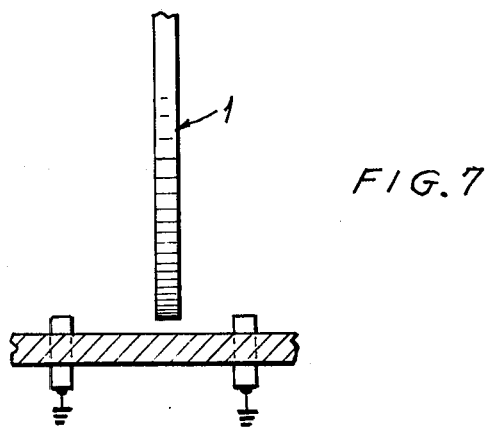
FIG. 7 shows an embodiment in which the member to be cut off is grounded at two points.

It has been found that this continuous grinding could very easily be effected by utilizing the electric current supplying the disc, on condition that the density I of the current as a function of the time $t$ is defined by certain functions $I = f(t)$ corresponding to the curves illustrated in FIGS. 5 and 6.

FIG. 5 represents a standard alternating current. In the zone 6, the direction of the current corresponds to the cutting of the material; in the zone 7, the direction of the current corresponds to an erosion of the disc with a sharpening operation and an adjustment of the radius R which is then the same over the whole periphery of the disc. It should be noted that this zone 7 also corresponds to the evacuation of the metal particles removed from the material to be cut-off or parted. It is therefore quite possible to utilize an alternating current for sharpening; however, in the case of the standard alternating current, the amplitude of the sharpening current and also the duration of this current are relatively large, which results in premature wear of the disc.

For this reason, there will preferably be employed a current of the type illustrated in FIG. 6, which shows a cutting zone 8 and a sharpening zone 9, this latter being of small duration and amplitude. Other forms of current may also be contemplated according to the varied resistance to wear of the discs utilized. Thus, a standard alternating current as illustrated in FIG. 5 is quite valid if the disc has a very high resistance to wear.

In any case, it is quite obvious that if the disc is very resistant to wear, its radius will thus be constant in time and the second means referred to above are then superfluous.

In addition to the above-mentioned first and second means, the present invention is concerned with various types of disc utilizable for cutting-off by electric sparking.

The fundamental quality of the disc is of course that it is a conductor of electricity during the cutting operation. In addition, the structure of this disc must permit the dielectric cooling liquid to pass transversely in the disc, from one face of the disc to the other.

Figure 8:
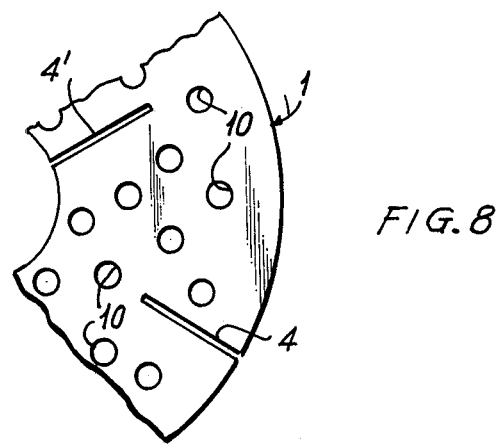
FIG. 8 is a partial plan view of a perforated disc.

According to a first alternative, perforated discs are employed as illustrated in FIG. 8. The shape of the perforations 10 is variable and round or square perforations may be arranged over all or part of the useful surface of the disc. It has been found that the best cutting results were obtained when the total surface area of the perforations represented from 10 to 50% and preferably in the neighbourhood of 20% of the total useful surface area of the disc.

According to a second alternative form, use is made of sintered discs resulting from the compression of particles of the constituent substance or substances of the disc.

In accordance with a third alternartive form, use is made of discs made from one or a number of cellular substances with open pores.

It should be noted that in all these alternative forms, the disc is provided with peripheral and, if so required, central radial slots such as these have been defined peviously in this description. As regards the substances or substances constituting the disc and provided especially in the perforated, sintered or cellular form, various tests have been made. Generally, the disc is made from a single substance which may be metallic, and in this case, the following metals or alloys are suitable: steel, aluminium, copper, brass. It should be observed that clockwork brass, complying with the U Z39 Pbl formula is quite remarkable for parting by electric sparking.

The disc may also be made of rubber filled especially with graphite or iron filings, of graphite or of cupro-graphite; the substance chosen actually depends on the material to be cut.

Figure 9:
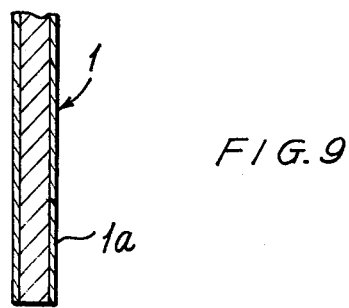
FIG. 9 is a partial transverse sectional view of a disc having its outer lateral surfaces covered with an alloy different from that of which the core of the disc is made.

In certain cases there is an advantage in utilizing discs having several substances, finally terminating in "sandwich" discs as illustrated in FIG. 9, the two outer layers being constituted by certain substances which give the cut certain properties. Thus, aluminum gives a certain polish to the cut but in other hypotheses there will be employed for example chromium or light alloys.

The various examples of construction which have been given above are cited purely by way of indication and it will of course be understood that those skilled in the art may effect any modification of the present invention to its scope, without thereby departing from the spirit of the said invention.

What I claim is:

1. In a device for cutting material by means of electric sparks, said device comprising a disc of electrically conductive material through which a dielectric liquid circulates, means supporting said disc for rotary motion, and means for providing an electrical current between the periphery of said disc and said material, the improvement according to which said disc is formed with a group of circumferentially spaced radial slots therein which inhibit deformation of said disc by said current, said slots having a length equal to at least L/2, where L = the radial distance between the periphery of said disc and said supporting means.

2. Device as claimed in claim 1 in which said disc is formed with a second group of radial slots extending from said support for a distance at least equal to L/2 but less than L, and the outer ends of said second group of slots extends radially outward beyond the inner ends of said first-mentioned group of slots.

3. Device as claimed in claim 1 in which said radial slots have a width at least equal to 1.75 R/100 and preferbly equal to 2R/100, where R represents the radius of said disc.

4. Device as claimed in claim 1 comprising two ground connections for the material to be cut, one located on each side of the plane of cut defined by said disc.

5. Device as claimed in claim 1 in which said current is an alternating current which cuts said material when it flows in one direction and sharpens the edge of said disc when it flows in the other.

6. Device as claimed in claim 5 in which said alternating current flows in one direction for longer periods of time than in the other direction.

7. Device as claimed in claim 5 in which said current flows in each direction for the same length of time.

8. Device as claimed in claim 1 in which said disc is made from a sintered material.

9. Device as claimed in claim 1 in which said disc is made of an open-pore cellular material.

10. Device as claimed in claim 1 in which the disc is perforated, with the total surface area of the perforations representing 10 to 50% of the total area of the disc radially outward of said support.

11. Device as claimed in claim 10 in which said disc is made of at least one metallic material.

12. Device as claimed in claim 11 in which said disc is made of clockwork brass.

13. Device as claimed in claim 10 in which said disc is made of rubber filled with a substance selected from the group consisting of graphite and iron fillings.

14. Device as claimed in claim 10 in which said disc is made of a material selected from the group consisting of graphite and cupro-graphite.

15. Device as claimed in claim 10, in which the outer lateral surfaces of said disc are covered with a material selected from the group consisting of aluminum, light metal alloys, chromium and chromium alloys.

* * * * *